US008941630B2

(12) United States Patent
Fujikawa

(10) Patent No.: US 8,941,630 B2
(45) Date of Patent: Jan. 27, 2015

(54) DEVICE SUBSTRATE

(75) Inventor: Yohsuke Fujikawa, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 187 days.

(21) Appl. No.: 13/391,480

(22) PCT Filed: Apr. 23, 2010

(86) PCT No.: PCT/JP2010/057210
§ 371 (c)(1),
(2), (4) Date: Feb. 21, 2012

(87) PCT Pub. No.: WO2011/027589
PCT Pub. Date: Mar. 10, 2011

(65) Prior Publication Data

US 2012/0146972 A1 Jun. 14, 2012

(30) Foreign Application Priority Data

Sep. 2, 2009 (JP) ................................ 2009-202234

(51) Int. Cl.
*G06F 3/038* (2013.01)
*G02F 1/1345* (2006.01)

(52) U.S. Cl.
CPC ........ *G02F 1/13452* (2013.01); *G02F 1/13454* (2013.01)
USPC .......................................................... 345/206

(58) Field of Classification Search
None
See application file for complete search history.

(56) References Cited

U.S. PATENT DOCUMENTS

2003/0090614 A1* 5/2003 Kim et al. ..................... 349/149
2009/0231312 A1* 9/2009 Fujikawa ..................... 345/206

FOREIGN PATENT DOCUMENTS

| | | | | |
|---|---|---|---|---|
| EP | 1069457 A1 | 1/2001 | | |
| JP | 11-338438 A | 12/1999 | | |
| JP | 2008-076443 A | 4/2008 | | |
| WO | 2007/026446 A1 | 3/2007 | | |
| WO | WO 2007026446 A1 * | 3/2007 | .................... | 349/149 |
| WO | 2008/053622 A1 | 5/2008 | | |
| WO | WO 2008053622 A1 * | 5/2008 | ................ | G09F 9/00 |

OTHER PUBLICATIONS

Official Communication issued in International Patent Application No. PCT/JP2010/057210, mailed on Jun. 8, 2010.

* cited by examiner

*Primary Examiner* — Kathy Wang-Hurst
*Assistant Examiner* — Douglas M Wilson
(74) *Attorney, Agent, or Firm* — Keating & Bennett, LLP

(57) ABSTRACT

An element-side substrate includes an element array area, an RGB switch circuit, and a source driver IC. The center of a terminal group coupled to video signal lines of the source driver IC is shifted (displaced) by a distance "g" leftward from the center of the RGB switch circuit, thereby making it possible to lengthen portions of bent left video signal lines that extend in the top-bottom direction while shortening portions of bent right video signal lines that extend in the top-bottom direction. As a result, it is possible to shorten a distance "h" between the source driver IC and the RGB switch circuit while fully avoiding interference with a large area occupied by left control lines and also avoiding interference with a small area occupied by right control lines.

10 Claims, 5 Drawing Sheets

SOURCE DRIVER IC
RGB SWITCH CIRCUIT
103
112
1031
2011
201a
2111
211n
2021
202b
c
d
e
f1
f2
g
h
p
θ

DEVICE SUBSTRATE

TECHNICAL FIELD

The present invention relates to device substrates, such as display panels, which include element arrays, more specifically to a device substrate including lines for providing signals to element arrays, along with control lines.

BACKGROUND ART

In recent years, various flat-panel devices as typified by liquid crystal display devices have been put into practical use, and they are often provided in a variety of types of electronic equipment, including, for example, mobile electronic equipment such as cell phones. In particular, such mobile electronic equipment achieves further miniaturization by integrally, i.e., monolithically, forming display elements with part or all of its driver circuits on a polysilicon device substrate.

The configuration of a liquid crystal panel, which is a liquid crystal display device having display elements and driver circuits monolithically formed on a substrate as mentioned above, will be described with reference to FIGS. 4 and 5.

FIG. 4 is an external perspective view of a conventional liquid crystal panel. As shown in FIG. 4, this liquid crystal panel 900 is formed by providing a liquid crystal layer between an element-side substrate 901 and an opposing-side substrate 902, and these substrates are attached via a predetermined seal material in which the liquid crystal layer is enclosed.

Furthermore, the element-side substrate 901, which is a device substrate, has formed thereon an element array area 905 consisting of display elements arranged in a matrix, each element being made up of pixel circuits which include thin-film transistors (TFTs), and driver circuits for driving the display elements, including, for example, agate driver to be described later, are formed around the element array area 905.

Note that, in actuality, the element-side substrate 901 has provided on its surface opposite to the opposing-side substrate 902 a backlight unit for radiating light in the direction toward the opposing-side substrate 902 or a reflective plate for reflecting outside light in the same direction, and the transmittance of the light is changed to a desired value by appropriately controlling the voltage applied to the liquid crystal (specifically, the voltage between pixel electrodes provided for their respective display elements and a common electrode on the opposing-side substrate 902 provided commonly for the display elements), so that display is provided at adesired tone in the direction toward the opposing-side substrate 902.

Furthermore, the element-side substrate 901 is connected to an FPC (flexible printed circuit) substrate 904 to which video signals are transmitted from outside the liquid crystal panel 900, and the video signals are supplied through the FPC substrate 904 to a source driver IC 903 provided on the element-side substrate 901. The source driver IC 903 provides the video signals to the display elements within the element array area 910. A further detailed circuit configuration of the element-side substrate 901 will be described.

FIG. 5 is a plan view illustrating a circuit configuration of the conventional element-side substrate having part of its driver circuits monolithically formed with display elements. As shown in FIG. 5, the element-side substrate 901 has a plurality of display elements arranged in a matrix within the aforementioned element array area 905, the display elements display red (R), green (G), or blue (B), and each group (unit) of three display elements for displaying these three colors forms a single color pixel. In the figure, for example, a display element 951 displays red, and a single color pixel is formed by three adjacent display elements arranged in the row direction. The display elements are provided near intersections of a plurality of source lines provided in parallel in the column direction (here, the vertical direction of the screen) and a plurality of gate lines provided in parallel in the row direction (here, the horizontal direction of the screen), and video signals provided from the source lines are received and held by (TFTs included in) display elements activated at predetermined times by scanning signals from a gate driver 911, which is a row control circuit monolithically formed within the element-side substrate 901. These features are well-known, and therefore, any detailed descriptions thereof will be omitted.

Furthermore, the element-side substrate 901 has monolithically formed thereon an RGB switch circuit 912, which consists of a plurality of sampling units, including a sampling unit 9121, for sequentially switching source lines coupled to the display elements for displaying the three colors, and control circuits 913*a* and 913*b* provided on opposite ends of the circuit, including various signal protection element units, buffer circuits, level shifter circuits, and so on. In addition, provided outside a sealed area 906 of the element-side substrate 901 are a plurality of control signal terminals 940 for connection with the FPC substrate 904, the source driver IC 903 included in the aforementioned driver circuits (as a part), and input signal terminals 941 to the source driver IC 903.

The conventional liquid crystal panel is configured to receive well-known control signals (e.g., clock pulses, start pulses, etc.) from an unillustrated external display control circuit, and concretely, these control signals are provided to the RGB switch circuit 912 and the gate driver 911 via the control signal terminals 940. Note that the control circuits 913*a* and 913*b* are supplied with power from an unillustrated power supply circuit via power lines.

Furthermore, to provide a predetermined common potential to the common electrode of the opposing-side substrate 902, four common transfer electrodes 907 are provided on the element-side substrate 901. The common transfer electrodes 907 are electrically connected to the common electrode via conductive particles or suchlike contained in a conductive paste or a seal material. The common transfer electrodes 907 are connected to the control signal terminals 940 via wiring, and are externally provided with the predetermined common potential.

Here, since the number of lines for providing video signals from the source driver IC 903 to the RGB switch circuit 912 is significant (typically, several hundred), and the long side (horizontal or column-wise) of the RGB switch circuit 912 is normally longer than the long side of the source driver IC 903, these lines are provided so as to spread like a fan from the source driver IC 903 to the RGB switch circuit 912. In such a case, the distance "h" between the source driver IC 903 and the RGB switch circuit 912 needs to be somewhat long, even if wiring intervals (pitches) are minimized within design tolerance.

However, as the distance "h" increases, a frame region around the element array area 905 widens. The frame region does not contribute to display and therefore is desirably small, and furthermore, it is desirably as small as possible to miniaturize the liquid crystal display device.

Therefore, conventional liquid crystal display devices are configured, for example, such that, where a plurality of source drivers IC are provided, the number of output terminals (the number of lines) thereof is set to a divisor of the total number of signal lines without leaving a remainder (see Japanese Laid-Open Patent Publication No. 11-338438), and the number of control signals to be provided to the RGB switch circuit is reduced (see Japanese Laid-Open Patent Publication No. 2008-76443), and such configurations can reduce the frame region.

CITATION LIST

Patent Document

Patent Document 1: Japanese Laid-Open Patent Publication No. 11-338438

Patent Document 2: Japanese Laid-Open Patent Publication No. 2008-76443

SUMMARY OF INVENTION

Problems to be Solved by the Invention

However, the conventional liquid crystal display devices do not particularly take into consideration the positional relationship between the source driver IC 903 and the RGB switch circuit 912. Accordingly, to avoid interference between the control signal lines connected to the control circuits 913*a* and 913*b* and the lines for providing video signals, it is often the case that the distance "h" between the source driver IC 903 and the RGB switch circuit 912 is designed to be longer. In such a case, the frame region becomes larger. The above is not limited to display panels with pixel circuits arranged in a matrix, and can be said of any device substrates including element arrays.

Therefore, an objective of the present invention is to provide a device substrate and a display device substrate having their source drivers IC arranged at appropriate positions to achieve reduced frame regions.

Solution to the Problems

A first aspect of the present invention is directed to a device substrate having a plurality of elements formed thereon, comprising:

an element array section including a plurality of elements arranged in a matrix so as to form pluralities of rows and columns, and a first control circuit for controlling drive of the elements;

a second control circuit for controlling drive of the elements, the circuit having a long side shorter than a circumferential side of the element array section and being arranged with the long side approximately parallel to the circumferential side at a predetermined distance;

a plurality of element lines connecting the element array section to a plurality of terminals for transmitting signals to be provided to the elements, the terminals including terminals close to the center of the long side and included in the second control circuit; and a plurality of control lines connecting the first control circuit to a plurality of terminals for transmitting signals to control drive of the elements, the terminals at least including terminals close to one end of the long side and included in the second control circuit, wherein, the element lines include lines bent so as not to interfere with areas occupied by the control lines, and the second control circuit is arranged such that the center of a portion of the long side that corresponds to where the terminals to be connected to the element lines are arranged is displaced a predetermined distance from a position corresponding to the center of the circumferential side toward one of the long side's ends that is situated in the larger of the areas occupied by the control lines to be connected.

In a second aspect of the present invention, based on the first aspect of the invention, the bent lines include first segments extending from the terminals to bends so as to have a first angle with respect to the long side, and second segments extending from the bends to the element array section so as to have a second angle with respect to the long side, and the first segments arranged on a displacement direction side with respect to the center of the corresponding portion of the long side have a greater average or maximum length than the first segments arranged on a side opposite to the displacement direction side with respect to the center of the corresponding portion of the long side.

In a fourth aspect of the present invention, based on the first aspect of the invention, the second control circuit has more terminals connected to the control lines on a displacement direction side with respect to the center of the corresponding portion of the long side than on a side opposite to the displacement direction side.

In a fifth aspect of the present invention, based on the first aspect of the invention, sections of the control lines that are vertical to the long side of the second control circuit are longer in the occupied area on a displacement direction side with respect to the center of the corresponding portion of the long side than in the occupied area on a side opposite to the displacement direction side.

In a third aspect of the present invention, based on the first aspect of the invention, the element lines arranged farthest in a direction opposite to a displacement direction with respect to the center of the corresponding portion of the long side are not bent to avoid interference with their surroundings.

In a sixth aspect of the present invention, based on the first aspect of the invention, the element array section further includes a third control circuit for controlling rows or columns of elements to be driven on a predetermined basis of one by one or more in a direction vertical to an array direction of the elements controlled by the first or second control circuit, and the third control circuit is provided close to a circumferential side of the element array section on a displacement direction side, and is connected to the control lines.

In a seventh aspect of the present invention, based on the first aspect of the invention, the element array section includes a plurality of display elements provided as the plurality of elements and including pixel circuits for displaying pixels included in an image, the first control circuit includes a column control circuit for controlling drive of the display elements by dividing the columns into groups of two or more and outputting signals to be provided to the groups such that the groups are sequentially switched by time division within a predetermined period of time, the second control circuit is a source driver circuit for providing video signals received from outside the substrate to the column control circuit such that the video signals are supplied to display elements to provide display corresponding to the signals, and the element lines connect the column control circuit to the source driver circuit.

Effect of the Invention

According to the first aspect of the present invention, the second control circuit is arranged such that the center of a portion of the long side that corresponds to where the terminals to be connected to the element lines are arranged is displaced (shifted) a predetermined distance from a position corresponding to the center of a circumferential side of the element array section toward one of the long side's ends that is situated in the larger of the areas occupied by the control lines to be connected. As a result, it is possible to shorten the distance between the second control circuit and the element array section while fully avoiding interference with the control lines occupying the larger area and also avoiding interference with the control lines occupying the smaller area. Thus, it is rendered possible to achieve a smaller frame region (which typically has the second control circuit provided therein), thereby reducing the outer size of the device.

According to the second aspect of the present invention, the first segments arranged on the displacement direction side have a greater average or maximum length than the first segments arranged on the opposite side, and therefore, it is rendered possible to shorten the distance between the second control circuit and the element array section while fully avoiding interference with the control lines occupying the larger area (on the displacement direction side) and also avoiding interference with the control lines occupying the smaller area (on the side opposite to the displacement direction side), so that a smaller frame region can be achieved.

According to the third aspect of the present invention, the element lines arranged farthest in a direction opposite to the displacement direction are left unbent, and therefore, it is possible to arrange the second control circuit, typically, such that the distance between the second control circuit and the element array section is minimized without the need to perform bending in order to avoid interference with the area occupied by the control lines, so that a smaller frame region can be achieved.

According to the fourth aspect of the present invention, the second control circuit has more terminals connected to the control lines on the displacement direction side than on the opposite side, and therefore, simply, the area occupied by the control lines is larger on the displacement direction side. Thus, by displacing (shifting) the second control circuit to the side with more terminals, it is rendered possible to shorten the distance between the second control circuit and the element array section while fully avoiding interference with the control lines occupying the larger area and also avoiding interference with the control lines occupying the smaller area, so that a smaller frame region can be achieved.

According to the fifth aspect of the present invention, the vertical sections of the control lines are longer in the occupied area on the displacement direction side than in the occupied area on the opposite side, and therefore, the area occupied by the control lines that can interfere with the element lines is larger on the displacement direction side. Thus, by displacing (shifting) the second control circuit to the side with longer vertical sections, it is rendered possible to shorten the distance between the second control circuit and the element array section while fully avoiding interference with the control lines occupying the larger area and also avoiding interference with the control lines occupying the smaller area, so that a smaller frame region can be achieved.

According to the sixth aspect of the present invention, the third control circuit is provided close to the circumferential side on the displacement direction side, and is connected to the control lines, and therefore, by displacing (shifting) the second control circuit to the third control circuit side, it is rendered possible to shorten the distance between the second control circuit and the element array section while fully avoiding interference with the control lines occupying the larger area and also avoiding interference with the control lines occupying the smaller area, so that a smaller frame region can be achieved.

According to the seventh aspect of the present invention, in the display device substrate with the element array section including a plurality of display elements, the element lines for connecting the column control circuit included in the first control circuit to the source driver circuit are bent, and the source driver circuit is displaced (shifted) a predetermined distance. As a result, it is rendered possible to shorten the distance between the column control circuit and the source driver circuit while fully avoiding interference with the control lines occupying the larger area and also avoiding interference with the control lines occupying the smaller area. Thus, it is rendered possible to achieve a smaller frame region (which typically has the source driver circuit provided therein), thereby reducing the outer size of the device.

MODE FOR CARRYING OUT THE INVENTION

Hereinafter, an embodiment of the present invention will be described with reference to the accompanying drawings.

<1. Overall Configuration>

Figure 4:
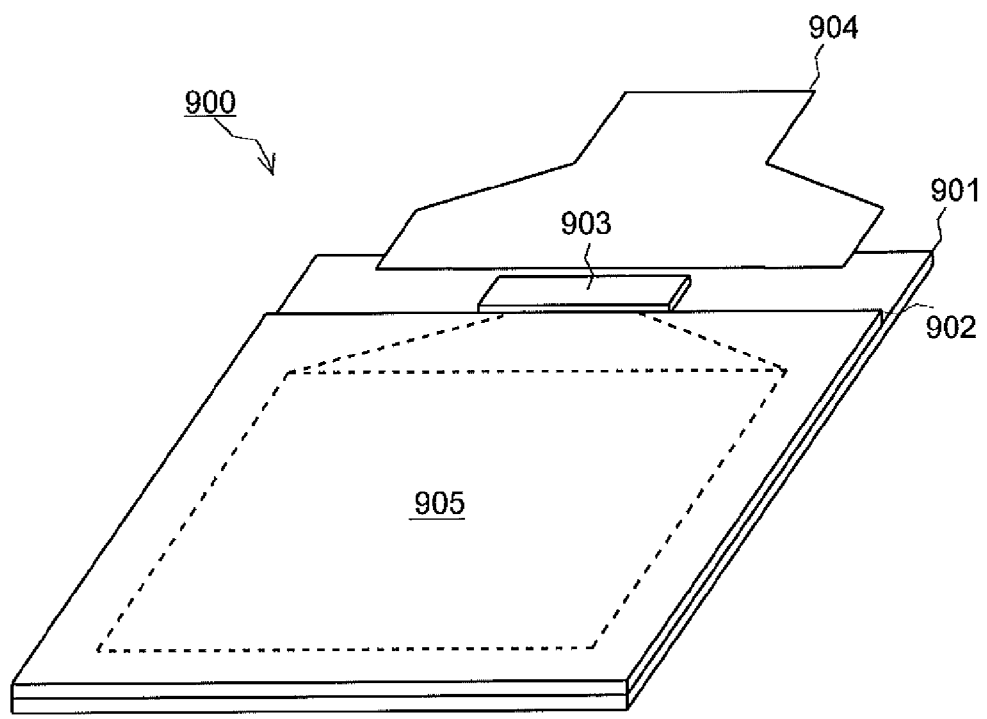
FIG. 4 is an external perspective view of a conventional liquid crystal panel.
Figure 5:
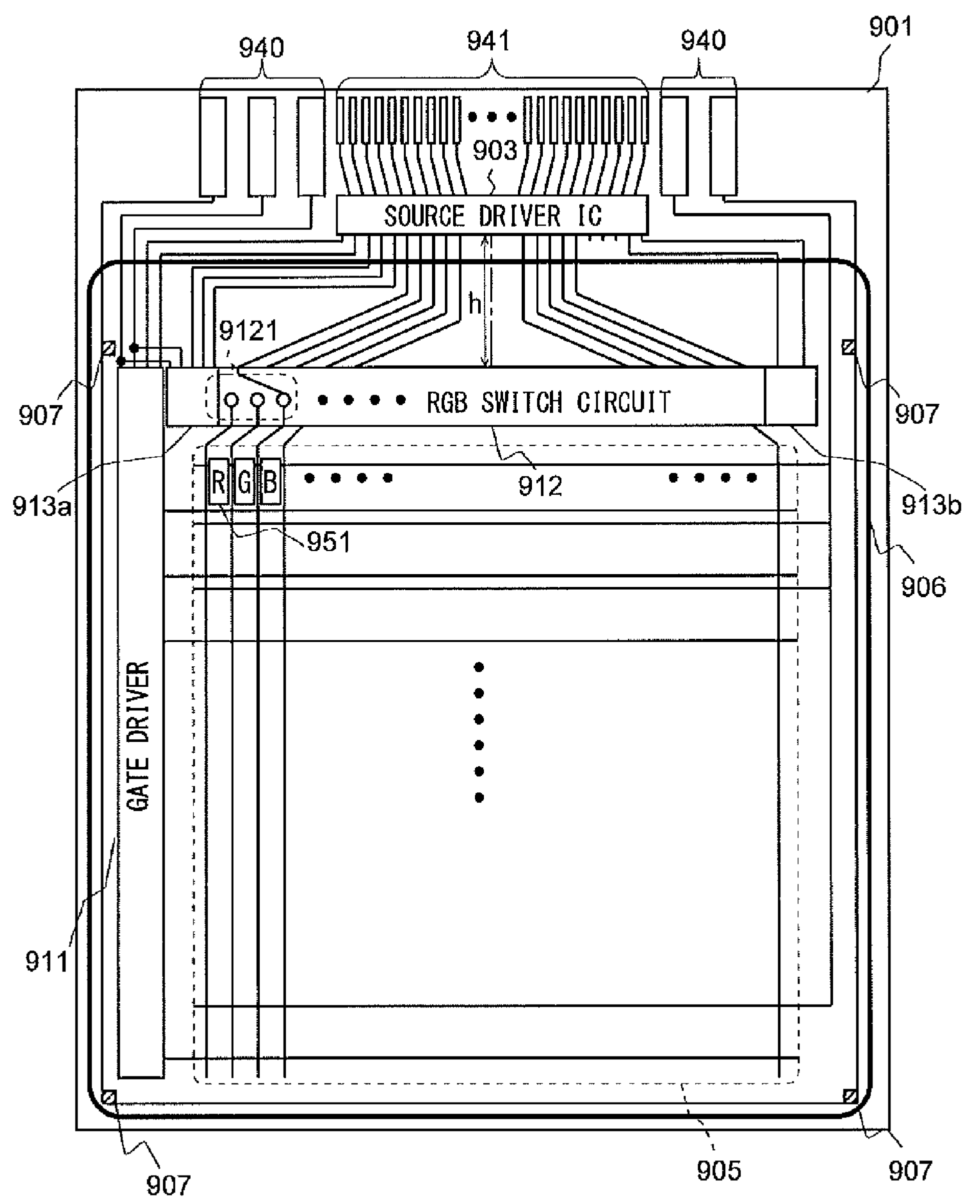
FIG. 5 is a plan view illustrating a circuit configuration of a conventional element-side substrate.

A liquid crystal panel, which is a display device according to an embodiment of the present invention, has almost the same configuration as conventional, except for features related to the position in which to arrange the source driver IC. Specifically, as with the external configuration of the conventional liquid crystal panel 900 shown in FIG. 4 and described earlier, this liquid crystal panel is configured by attaching an element-side substrate, which is a display device substrate, to an opposing-side substrate via a predetermined seal material in which the liquid crystal layer is enclosed between the substrates. In addition, the element-side substrate is connected to an FPC substrate to which video signals are externally transmitted, and the video signals are supplied through the FPC substrate to the source driver IC 103 provided on the element-side substrate. These features are well-known, and therefore, any detailed descriptions thereof will be omitted. Next, the configuration of the element-side substrate will be described.

Figure 1:
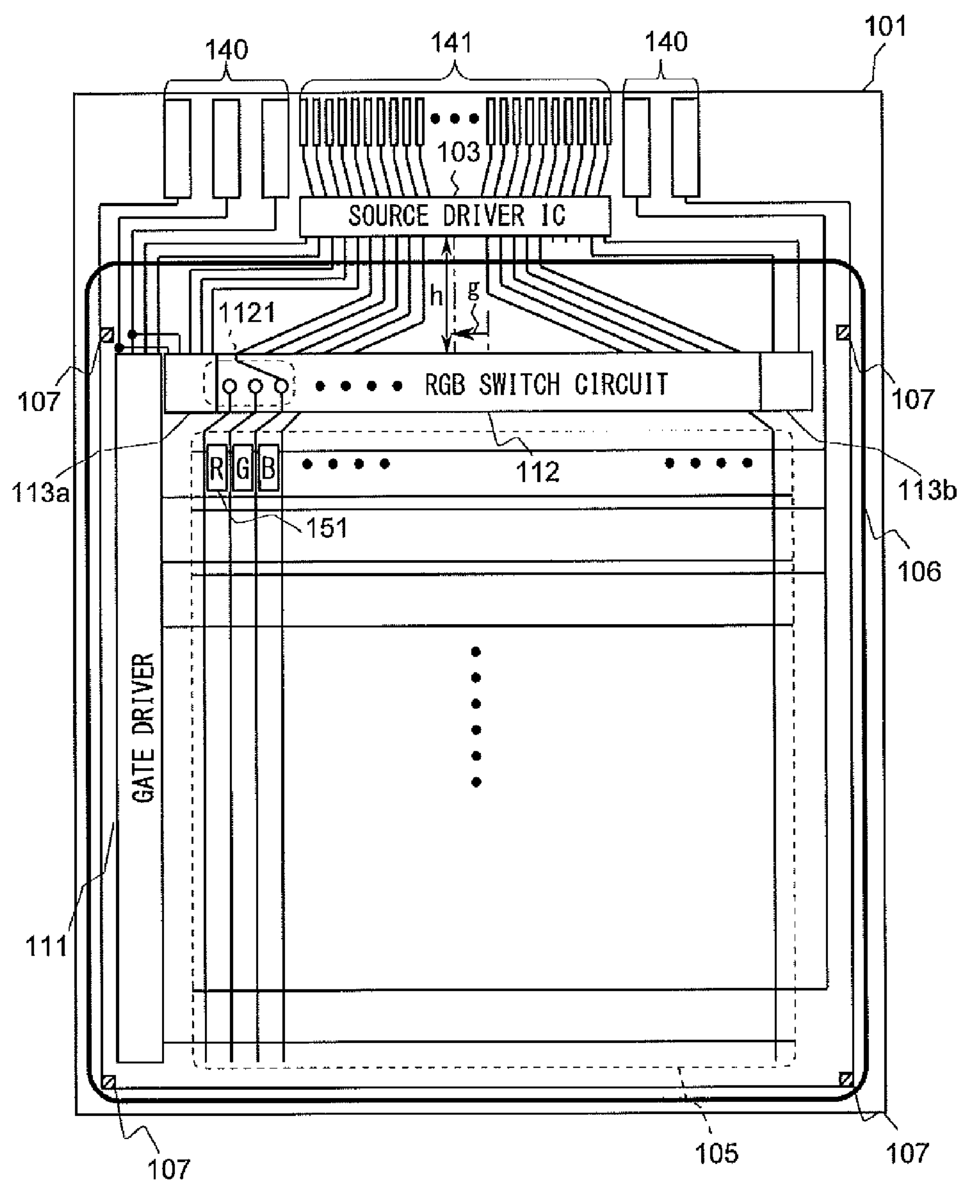
FIG. 1 is a plan view illustrating a circuit configuration of an element-side substrate in an embodiment of the present invention.

FIG. 1 is a plan view illustrating a circuit configuration of the element-side substrate having part of its driver circuits monolithically formed with display elements. Note that in the following, the direction along the long side of the source driver IC 103 shown in FIG. 1 (through FIG. 3) is assumed to be the right-left direction, and the direction along the short side is assumed to be the top-bottom direction.

As shown in FIG. 1, the element-side substrate 101 has a plurality of display elements arranged in a matrix within an element array area 105 similar to the element array area 905 in the conventional art, display elements 151 display red, for example, and each group (unit) of three display elements arranged in the row direction forms a single color pixel. The display elements are provided near intersections of a plurality of source lines provided in parallel in the column direction (in the figure, the vertical direction) and a plurality of gate lines provided in parallel in the row direction (in the figure, the horizontal direction), and video signals provided from the source lines are received and held by (TFTs included in) display elements activated at predetermined times by scanning signals from a gate driver 111, which is a row control circuit monolithically formed within the element-side substrate 101. These features are well-known, and therefore, any detailed descriptions thereof will be omitted.

Furthermore, the element-side substrate 101 has monolithically formed thereon an RGB switch circuit 112, which consists of a plurality of sampling units, including a sampling unit 1121, for sequentially switching source lines coupled to the display elements for displaying three colors, and control circuits 113*a* and 113*b* provided on opposite ends of the circuit, including various signal protection element units, buffer circuits, level shifter circuits, and so on. In addition, provided outside a sealed area 106 of the element-side substrate 101 are a plurality of control signal terminals 140 for connection with the FPC substrate 104, the source driver IC 103 included in the aforementioned driver circuits (as a part), and input signal terminals 141 to the source driver IC 103.

Furthermore, to provide a predetermined common potential to the common electrode of the opposing-side substrate 102, four common transfer electrodes 107 are provided on the element-side substrate 101. The common transfer electrodes 107 are electrically connected to the common electrode via conductive particles or suchlike contained in a conductive paste or a seal material. The common transfer electrodes 107 are connected to the control signal terminals 140 via wiring, and are externally provided with the predetermined common potential.

This liquid crystal panel, as with the conventional liquid crystal panel, is configured to receive well-known control signals (e.g., clock pulses, start pulses, etc.) from an unillustrated external display control circuit, and concretely, these control signals are provided to the RGB switch circuit 112 and the gate driver 111 via the control signal terminals 140. Note that the control circuits 113*a* and 113*b* are supplied with power from an unillustrated power supply circuit via power lines.

Here, as shown in FIG. 1, the number of lines for providing video signals from the source driver IC 103 to the RGB switch circuit 112 is ⅓ of the number of source lines for providing video signals to the display elements, so that the lines are selectively connected by the sampling units to their respective groups (units) of source lines, each group consisting of three source lines coupled to pixel circuits for displaying R, G, and B, respectively. Specifically, in one horizontal scanning period, i.e., a period in which one gate line is kept selected, the source lines for providing video signals are switched therebetween, such that, of the three source lines included in each group, the left source line coupled to the red (R) display element has the video signal from the source driver IC 103 applied thereto for the first portion of each horizontal scanning period divided into three equal portions, the first through third portions, and similarly, the center and right source lines coupled to the green (G) and blue (B) display elements have the video signals from the source driver IC 103 applied thereto for the second and third portions, respectively, of the horizontal scanning period.

Note that in this example, as in the conventional art, three source lines corresponding to adjacent R, G, and B pixel formation sections form a single group, but in the conventional display device, at least two or more source lines may be grouped, such that a plurality of source lines included in each group is assigned one output terminal of the source driver IC 103, and video signals are applied in a time-division manner to video signal lines in each group within one horizontal scanning period for image display. Accordingly, although the name "RGB switch circuit 112" is used, it is merely an example, and any column control circuit may be used. In addition, the RGB switch circuit 112, together with or without the source driver IC 103, may be referred to as the "source driver".

Here, although simplified in FIG. 1, in actuality, the lines for providing video signals from the source driver IC 103 to the RGB switch circuit 112 are provided in a significantly large number (e.g., 320), and the long side (horizontal or column-wise) of the RGB switch circuit 112 is longer than the long side of the typical source driver IC 103 (precisely, a portion of the long side where the terminal group connected to the lines is arranged), so that the lines are provided so as to spread like a fan from the source driver IC 103 to the RGB switch circuit 112. In such a case, the distance "h" between the source driver IC 103 and the RGB switch circuit 112 needs to be somewhat long, even if wiring intervals (pitches) are minimized within design tolerance. In addition, to avoid interference between the control signal lines connected to the control circuits 113*a* and 113*b* and the video signal lines connected to the RGB switch circuit 112, the distance "h" between the source driver IC 103 and the RGB switch circuit 112 is generally designed to be longer.

However, as will be described in detail later, the present embodiment is characterized in that the center of the long side of the source driver IC 103 (precisely, a corresponding portion of the long side where the terminal group connected to the video signal lines is arranged) is shifted (displaced) distance "g" leftward from the center of the RGB switch circuit 112, so that the aforementioned distance "h" is shortened. Hereinafter, on the premise of this characteristic, the relationship of the positions and intervals of the lines with respect to the distance "h" will be further described with reference to FIG. 2.

<2. Arrangement Configuration with the Source Driver IC Shifted Leftward>

Figure 2:
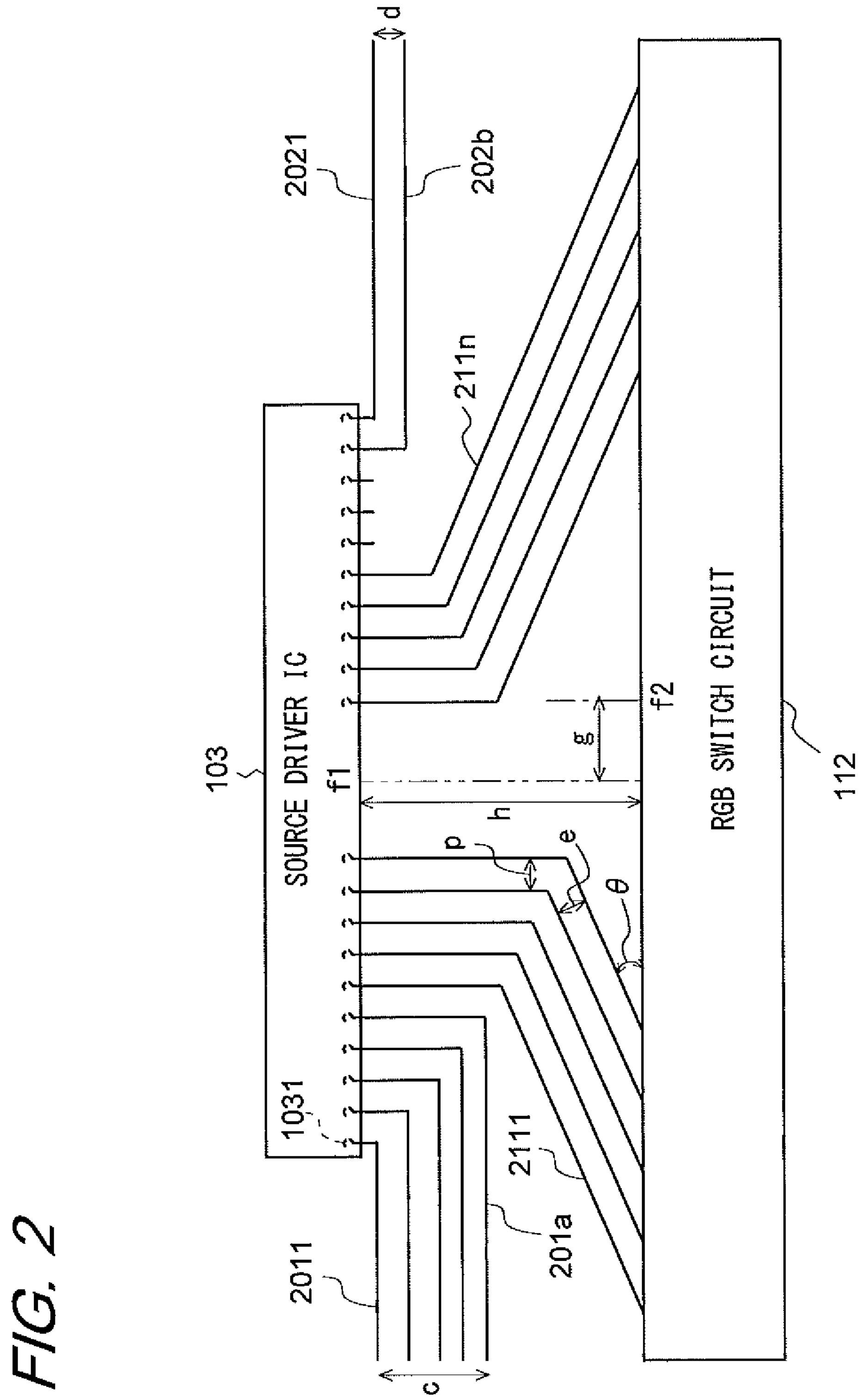
FIG. 2 is a plan view describing the position and intervals of lines between a source driver IC and an RGB switch circuit in the embodiment.

FIG. 2 is a plan view describing the position and intervals of the lines between the source driver IC and the RGB switch circuit. As shown in FIG. 2, the source driver IC 103 has a plurality of terminals, including a terminal 1031. The terminals are typically bump electrodes electrically connected to various lines, as mentioned above, formed on a glass substrate via, for example, an anisotropic conductive film (ACF).

Of these terminals, "a" terminals (where a=5), including the leftmost terminal 1031 on the long side of the source driver IC 103, are connected to "a" left control lines 2011 to 201*a*, the first "b" terminals (where b=2) from the right end of the long side are connected to "b" right control lines 2021 and 202*b*, and "n" intervening terminals (where n=320) are connected to "n" video signal lines 2111 to 211*n*. Note that the power lines are wide, and therefore, in actuality, each of them is often connected to a plurality of terminals, but, for convenience of explanation, it is assumed here that each line is connected to one terminal.

Furthermore, the left control lines 2011 to 201*a* and the right control lines 2021 and 202*b* include wide lines (e.g., from about tens to hundreds of micrometers wide), such as power lines. These lines, unlike the video signal lines 2111 to 211*n*, are generally provided so as to extend only in the right-left direction and the top-bottom direction, as shown in FIGS. 1 and 2, but not to extend obliquely. Accordingly, in actuality, these lines occupy large wiring areas. To simply indicate the size of the occupied areas, the top-bottom length of the wiring area occupied by the left control lines 2011 to 201*a* is referred to as the total left line width "c", and the top-bottom length of the wiring area occupied by the right control lines 2021 and 202*b* is referred to as the total right line width "d". In this case, from the fact c>d, it can be deduced that the area occupied by the left control lines 2011 to 201*a* (which might cause a problem of interference with the video signal lines) is larger than the area occupied by the right control lines 2021 and 202*b*. The reason for this is that, as will be described later, to avoid interference with the control lines, the video signal lines are initially provided so as to extend in the top-bottom direction a predetermined distance from the terminals of the source driver IC 103, so the total left line width "c" and the total right line width "d" are main factors for determining the size of the occupied area which might cause a problem of interference with the video signal lines.

Furthermore, assuming that the control lines are equal in width (or average width), it can be (readily) deduced also from the fact a>b that the area occupied by the left control lines 2011 to 201*a* is larger than the area occupied by the right control lines 2021 and 202*b*.

Next, to avoid interference with the areas occupied by the left control lines 2011 to 201*a* and the right control lines 2021 and 202*b*, the video signal lines 2111 to 211*n* are initially provided so as to extend a predetermined distance in the top-bottom direction, and then, they are bent so as to spread like a fan toward their corresponding sampling units (including the sampling unit 1121) in the RGB switch circuit 112. Note that although not all lines are shown in FIGS. 1 and 2, segments of the lines that extend from the bending positions to the sampling units (hereinafter, referred to as "oblique segments") make the same angle (acute angle) θ with respect to the right-left direction. Accordingly, the oblique segments are strictly not arranged in the same manner as the fan shape in which the lines closer to the center have their angles θ closer to 90 degrees, but the oblique segments may be arranged in a perfect fan shape or in a shape similar to that.

Furthermore, depending on, for example, the attributes of the lines (e.g., a wiring material, a film thickness, and the presence or absence of any protective film) and the resolution of an exposure device used for patterning, the minimum interval "e" between lines is constrained by the minimum conductor width and interval (L/S: Line and Space) based on design rules. Here, the angle θ between each of the oblique segments of the video signal lines 2111 to 211*n* and the positioning direction of the RGB switch circuit (the horizontal direction in the figure) is determined by the minimum interval "e" between lines and the interval between connections of the video signal lines and the RGB switch circuit, and the angle θ can be decreased by reducing the minimum interval "e" between lines.

Note that the extension angle of the leftmost video signal line in the fan may be the same as the extension angle of the rightmost video signal line, so that they are in an axially symmetric relationship, or they may be different from each other. However, when considering the arrangement to avoid interference with surrounding circuits and lines, it is preferable that the extension angle of the leftmost video signal of the line in the fan be in an axially symmetric relationship with the extension angle of the rightmost video signal line.

On the other hand, intervals "p" between (lines connected to) terminals of the source driver IC 103 depend on the layout of the source driver IC 103, and are set to be relatively long for the purpose of ensuring a sufficient area for connection of the video signal lines to the terminals of the source driver IC 103. Accordingly, it is often the case that e<p. On the premise of such a relationship, the video signal lines 2111 to 211*n* need segments extending in the top-bottom direction as shown in FIG. 1 or 2.

Note that interline areas between parallel video signal lines extending in the top-bottom direction are utilized, for example, as areas for pads to be provided such that they can be touched by a stylus for numbering or electrical evaluation. Alternatively, in the case of a liquid crystal cell with such areas being sealed, dummy wiring patterns for inhibiting uneven patterns under the seal from being sparse or dense are provided for adjustment of a so-called cell gap. In this case, the video signal lines are preferably provided in parallel with one another, because by being so provided, it is rendered possible to readily adjust the sparsity or density of the uneven patterns under the seal with simplified dummy wiring patterns.

On the premise of the conditions as mentioned above, it is rendered possible to readily calculate the distance "h" corresponding to the positional relationship between the source driver IC 103 and the RGB switch circuit 112 on the basis of the (top-bottom) lengths of the segments of the lines that extend in the top-bottomdirection, the angles θ of the oblique segments, the number of terminals, the length of each side, and so on.

Here, as shown in FIG. 2, the center f1 of the portion (line segment) of the source driver IC 103 that corresponds to the long side where the terminal group connected to the video signal lines is arranged (hereinafter, simply referred to as the "center of the terminal group connected to the video signal lines") is shifted (displaced) distance "g" leftward from the center f2 of the RGB switch circuit 112 (i.e., the center of the portion of the RGB switch circuit 112 that corresponds to the long side connected to the video signal lines). The reason for this is that the area occupied by the left control lines 2011 to 201*a* (which might cause a problem of interference with the video signal lines) is larger than the area occupied by the right control lines 2021 and 202*b*.

Specifically, some of the video signal lines 2111 to 211*n* that are connected to the terminals to the left of the center f1 of the terminal group of the source driver IC 103 and also connected to a portion of the RGB switch circuit 112 that is situated to the left of the center f2 (hereinafter, simply referred to as "left video signal lines") are bent after extending in the top-bottom direction to a great extent, in order to avoid interference with a large area occupied by the left control lines 2011 to 201*a*. On the other hand, some of the video signal lines 2111 to 211*n* that are connected to the terminals to the right of the center f1 of the terminal group of the source driver IC 103 and also connected to aportion of the RGB switch circuit 112 that is situated to the right of the center f2 (hereinafter, simply referred to as "right video signal lines") extend in the top-bottom direction to some but not considerable extent, in order to avoid interference with a small area occupied by the right control lines 2021 and 202*b*.

Therefore, unlike in the conventional art where the distance "h" is increased to avoid the interference, in the present embodiment, the distance "h" is decreased and the position of the source driver IC 103 is shifted (displaced) distance "g" to the left. As a result, although the lengths of the segments of the right video signal lines that extend in the top-bottom direction are shortened, the lengths of the segments of the left video signal lines that extend in the top-bottom direction can be lengthened. Thus, it is possible to fully avoid interference with the area occupied by the left control lines 2011 to 201*a* even if the area is large, and it is also possible to avoid interference with the area occupied by the right control lines 2021 and 202*b* because the area is small.

Furthermore, in other words, in the present embodiment, the distance "g" is determined to such an extent as to fully avoid the interference with the large area occupied by the left control lines 2011 to 201*a*, while avoiding the interference with the small area occupied by the right control lines 2021 and 202*b*.

Figure 3:
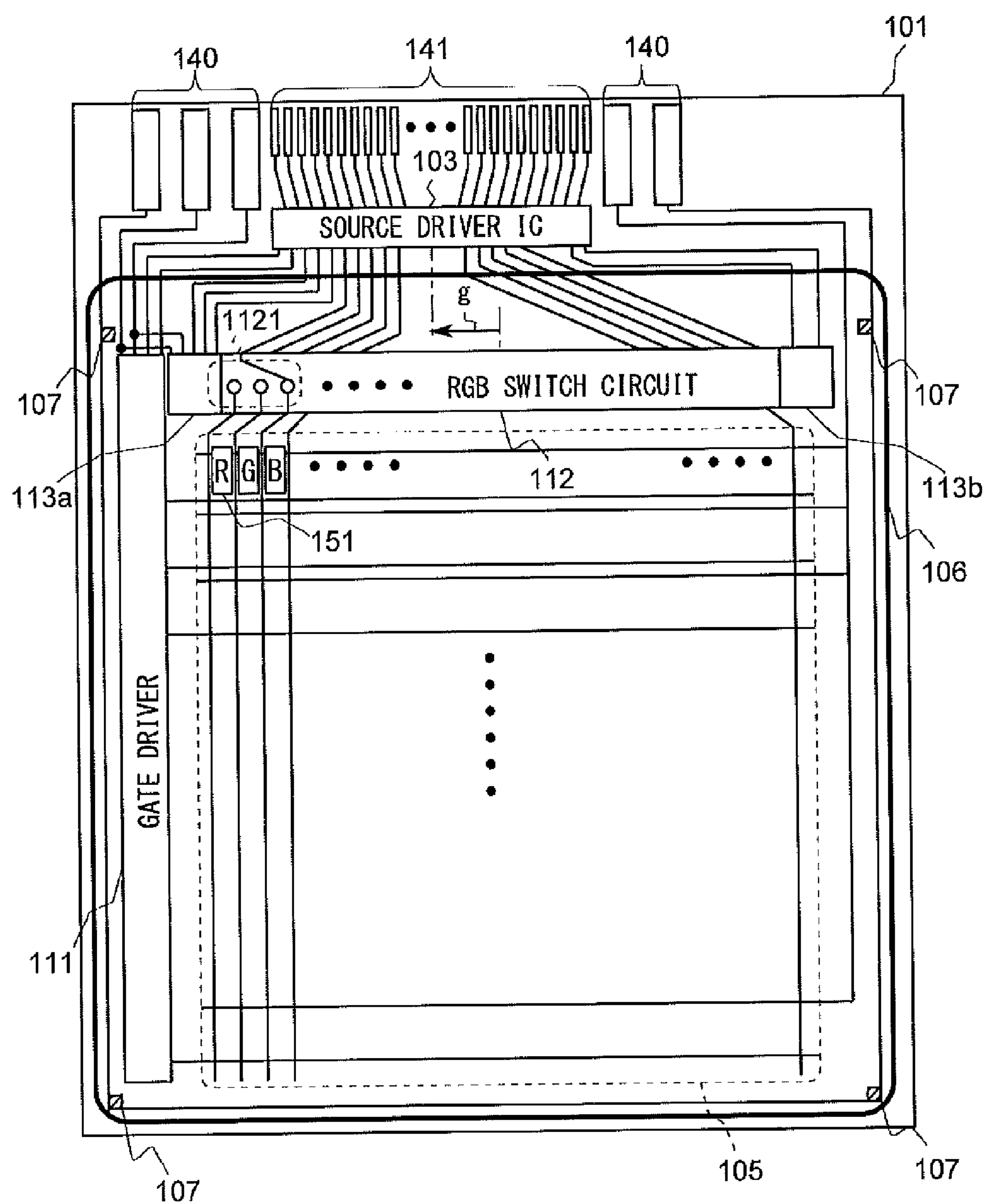
FIG. 3 is a plan view illustrating a circuit configuration of an element-side substrate having apart of its driver circuits monolithically formed with display elements in the embodiment, where the source driver IC is positioned farther to the left than in the configuration shown in FIG. 1.

Accordingly, since the area occupied by the right control lines 2021 and 202*b* is small, the lengths of the segments of the right video signal lines that extend in the top-bottom direction can be reduced to zero, as shown in FIG. 3, to such an extent as not to cause a serious problem of interference between the occupied area and the right video signal lines. Note that even in the case where "the lengths can be reduced to zero" as mentioned herein, to form an area for connecting the terminals of the driver IC 103 to the ends of the video signal lines, it is necessary to make such a shape change as to bend the end portions of the video signal lines within a small area. Accordingly, the wording "the lengths can be reduced to zero" as used herein is simply a convenient representation of the right video signal lines shown in FIG. 3 not having any sections extending in the top-bottom direction in the sheet of FIG. 3 to avoid interference with other components outside the mounting area of the source driver IC 103, and this wording should not be construed to mean that the video signal lines do not have any portions that extend in the top-bottom direction.

FIG. 3 is a plan view illustrating a circuit configuration of an element-side substrate having apart of its driver circuits monolithically formed with display elements, where the source driver IC is positioned farther to the left than in the configuration shown in FIG. 1. As shown in FIG. 3, the rightmost video signal line (the line corresponding to the video signal line 211*n* shown in FIG. 2) only includes an oblique segment connected to its corresponding terminal of the source driver IC 103, and substantially does not include any segment extending in the top-bottom direction. It can be said that such a configuration with only one of the (right) video signal lines substantially only including an oblique segment (portion) connected to its corresponding terminal of the source driver IC 103 can best minimize the distance "h" if the minimum interval "e" is a minimum value tolerated by layout rules.

Furthermore, as shown in FIG. 3, by additionally providing an oblique segment portion to the right control line 202*b*, the area occupied by the right control lines 2021 and 202*b* is changed in shape so as not to interfere with the rightmost video signal line (the line corresponding to the video signal line 211*n* shown in FIG. 2), which also might be effective in shortening the distance "h".

<3. Effect>

As described above, the center of the terminal group of the source driver IC 103 that is connected to the video signal lines is shifted (displaced) distance "g" leftward from the center of the RGB switch circuit 112, making it possible to lengthen the portions of the left video signal lines that extend in the top-bottom direction and shorten the portions of the right video signal lines that extend in the top-bottom direction. As a result, it is possible to shorten the distance "h" between the source driver IC 103 and the RGB switch circuit 112 while fully avoiding interference with the large area occupied by the left control lines 2011 to 201*a* and also avoiding interference with the small area occupied by the right control lines 2021 and 202*b*. By shortening the distance, it is rendered possible to provide a device substrate and a display device substrate with reduced frame regions. It is understood that, instead of shortening the distance "h" to reduce the frame region, an area made available by the aforementioned configuration can be utilized to achieve the effect of providing control lines with significantly greater widths and arranging more control lines in the same frame region.

<4. Variant>

In the above embodiment, each of the video signal lines includes a segment that extends in the top-bottom direction and an oblique segment, but instead of including the segment that extends in the top-bottom direction, the aforementioned oblique segment and another oblique segment which differs therefrom and has an angle θ' greater than the aforementioned oblique segment's angle θ (with respect to the right-left direction) may be included. Specifically, the oblique segment's angle θ is typically set to a minimum value in accordance with design rules, but the angle θ' may be set to any value less than or equal to 90 degrees so long as it is greater than the minimum value and interference with any control line can be avoided. In addition, the segment that extends in the top-bottom direction can be defined as a type of oblique segment having an angle θ' of 90 degrees.

The display device of the above embodiment is configured to include an RGB switch circuit employing a time-division drive system, but it may employ a standard drive system and may be configured to include no RGB switch circuit; the aforementioned effect can be achieved, for example, so long as the number of control output terminals of the source driver IC 103 and the number of control lines connected thereto or the area occupied by the control lines vary between the right- and left-side portions (of the long side) of the source driver IC 103. Accordingly, control circuits, such as a gate driver, are not required to be monolithically formed. Moreover, a circuit equivalent to the source driver IC 103 may be monolithically formed. Note that in this case, the frame region is not directly reduced, but by shortening the distance "h", the outer size of the device substrate can be reduced, resulting in the same effect as that achieved by reducing the frame region.

While the above embodiment has been described taking the liquid crystal panel as an example, the present invention is not limited to this and can also be applied to display devices using LEDs (light emitting diodes), such as organic EL (electro luminescence) elements, and other flat-panel display devices.

Furthermore, the liquid crystal panel of the above embodiment is formed by attaching the element-side substrate and the opposing substrate together, but this configuration is not restrictive, and a display device substrate equivalent to the element-side substrate may be used alone.

While the above embodiment has been described taking as examples the display device substrates, such as the element-side substrate of the liquid crystal panel, these examples are not restrictive, a wide range of applications can be offered, including other device substrates having element arrays and control circuits, such as driver circuits, formed thereon. For example, the present invention can also be applied to sensor panels including sensor matrices as element arrays and memory substrates including memory matrices as element arrays. Even in the case where the present invention is applied to such a device substrate, control circuits, such as driver circuits, can be arranged close to element arrays, resulting in a reduced frame region.

INDUSTRIAL APPLICABILITY

The present invention can be applied to, for example, device substrates, such as liquid crystal panels, which include element arrays, and is suitable for device substrates including lines for providing signals to the element arrays, along with control lines.

DESCRIPTION OF THE REFERENCE CHARACTERS

101 element-side substrate
103 source driver IC
105 element array area
106 sealed area
107 common transfer electrode
111 gate driver
112 RGB switch circuit
113*a*, 113*b* control circuit (e.g., level shifter circuit)
140 control signal terminal
151 display element
1121 sampling unit

The invention claimed is:

1. A device substrate including a plurality of elements located thereon, comprising:

an element array section including a plurality of elements arranged in a matrix so as to define pluralities of rows and columns, and a first control circuit configured to control driving of the plurality of elements;

a second control circuit contained entirely within an integrated circuit chip and configured to control driving of the plurality of elements, the integrated circuit chip having a long side shorter than a circumferential side of the element array section and being arranged with the long side approximately parallel to the circumferential side at a predetermined distance;

a plurality of element lines, each comprising a first segment and a second segment, positioned between the first control circuit and the second control circuit and arranged to connect the first control circuit to a plurality of first terminals configured to transmit signals from the second control circuit to the first control circuit to be provided to the elements, the plurality of first terminals are located within the integrated circuit chip at a center of the long side; and a plurality of control lines including a first group of control lines arranged between the first control circuit and the second control circuit to connect connecting the first control circuit to a plurality of second terminals configured to transmit signals from the second control circuit to the first control circuit to control driving of the plurality of elements, the plurality of second terminals are located within the integrated circuit chip at a lateral end of the long side, wherein, the element lines are bent at a point where the first and second segments connect so as not to interfere with areas occupied by the plurality of control lines, and the second control circuit is arranged such that the center of the long side is displaced a predetermined distance from a position corresponding to a center of the circumferential side toward one of two lateral ends of the long side that includes more of the plurality of second terminals.

2. The device substrate according to claim 1, wherein, the bent lines include:

first segments extending from the first terminals and configured to bend so as to have a first angle with respect to the long side; and second segments extending from the bends to the element array section so as to have a second angle with respect to the long side, and the first segments arranged on a displacement direction side with respect to the center of the corresponding portion of the long side have a greater average or maximum length than the first segments arranged on a side opposite to the displacement direction side with respect to the center of the corresponding portion of the long side.

3. The device substrate according to claim 1, wherein the element lines arranged farthest in a direction opposite to a displacement direction with respect to the center of the corresponding portion of the long side are not bent to avoid interference with their surroundings.

4. The device substrate according to claim 1, wherein the second control circuit includes more of the plurality of second terminals connected to the control lines on a displacement direction side with respect to the center of the corresponding portion of the long side than on a side opposite to the displacement direction side.

5. The device substrate according to claim 1, wherein sections of the control lines that are vertical to the long side of the second control circuit are longer in the occupied area on a displacement direction side with respect to the center of the corresponding portion of the long side than in the occupied area on a side opposite to the displacement direction side.

6. The device substrate according to claim 1, wherein, the element array section further includes a third control circuit configured to control rows or columns of elements to be driven on a predetermined basis of one by one or more in a direction vertical to an array direction of the elements controlled by the first or second control circuit, and the third control circuit is provided close to a circumferential side of the element array section on a displacement direction side, and is connected at least one of the control lines.

7. The device substrate according to claim 1, wherein, the element array section includes a plurality of display elements provided as the plurality of elements and including pixel circuits configured to display pixels included in an image, the first control circuit includes a column control circuit configured to control driving of the display elements by dividing the columns into groups of two or more and outputting signals to be provided to the groups such that the groups are sequentially switched by time division within a predetermined period of time, the second control circuit is a source driver circuit configured to provide video signals received from outside the substrate to the column control circuit such that the video signals are supplied to display elements to provide display corresponding to the signals, and the element lines connect the column control circuit to the source driver circuit.

8. The device substrate according to claim 6, wherein the plurality of control lines further include a second group of control lines arranged between the third control circuit and the second control circuit to connect the third control circuit to third terminals configured to transmit signals from the second control circuit to the third control circuit to control driving of the elements, the third terminals are located within the integrated circuit chip at only one lateral end of the long side, and a direction in which the second control circuit is displaced the predetermined distance from the position corresponding to the center of the circumferential side is towards the only one lateral end of the long side where the third terminals are located.

9. The device substrate according to claim 2, wherein the first angles of all of the bent lines are the same and the second angles of all of the bent lines are the same.

10. The device substrate according to claim 2, wherein the first angle is 90 degrees.

* * * * *